United States Patent
Nakai et al.

(10) Patent No.: US 7,860,303 B2
(45) Date of Patent: Dec. 28, 2010

(54) IMAGE PROCESSING APPARATUS, PROGRAM, AND RECORDING MEDIUM

(75) Inventors: Yoshiyuki Nakai, Nara (JP); Akihiko Taniguchi, Nara (JP); Yohichi Shimazawa, Nara (JP); Koichi Sumida, Nara (JP); Katsumi Nagata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 954 days.

(21) Appl. No.: 11/542,585

(22) Filed: Oct. 2, 2006

(65) Prior Publication Data
US 2007/0097413 A1    May 3, 2007

(30) Foreign Application Priority Data
Oct. 31, 2005    (JP) .............................. 2005-316543

(51) Int. Cl.
*G06K 9/00* (2006.01)
(52) U.S. Cl. ....................................... 382/162; 382/167
(58) Field of Classification Search ................. 382/162, 382/167; 347/15, 19, 2; 358/1.15, 1.13, 358/1.14, 3.03, 3.26, 3.28; 380/233, 242; 725/135, 136; 348/E5.108, E5.114
See application file for complete search history.

(56) References Cited

U.S. PATENT DOCUMENTS 7,027,189 B2 *   4/2006   Umeda ..................... 358/3.03
7,396,097 B2 *   7/2008   Yamazaki et al. ............. 347/15

FOREIGN PATENT DOCUMENTS

| JP | 07-036325   | 2/1995 |
| JP | 07-038737   | 2/1995 |
| JP | 2003-224717 | 8/2003 |
| JP | 2004-112357 | 4/2004 |

\* cited by examiner

*Primary Examiner*—Anh Hong Do
(74) *Attorney, Agent, or Firm*—Edwards Angell Palmer & Dodge LLP; David G. Conlin; Peter J. Manus (57) ABSTRACT

An image processing apparatus is provided which can output an image from which only specific image information can be positively detected when the specific image information used to prohibit copying of image information is added to image data. The present invention includes a specific image information adding portion that adds specific image information representing a specific image to image data when image processing is performed for input image data and a specific image information setting portion that sets a color and/or number of the specific image information.

5 Claims, 9 Drawing Sheets

IMAGE PROCESSING APPARATUS, PROGRAM, AND RECORDING MEDIUM

This Nonprovisional application claims priority under 35 U.S.C. §119(a) on Patent Application No. 2005-316543 filed in JAPAN on Oct. 31, 2005, the entire contents of which are hereby incorporated herein by references.

FIELD OF THE INVENTION

The present invention relates to an image processing apparatus, a program, and a recording medium and, more particularly, relates to an image processing apparatus that can add specific image information to image data to prohibit copying thereof, a program incorporated into the apparatus to add the specific image information, and a computer-readable recording medium that records the program.

BACKGROUND OF THE INVENTION

In order to prevent unauthorized copying of original printed documents, techniques which add specific image information such as background pattern when the original document is printed have been used. This specific image information is often referred to as "copy preventing information" or "anti-copy information".

For example, when image data is fed from an application running on a personal computer to a printer for printing out the image data from the printer, specific image information which prevents the copying of the image to be printed is fed to the printer together with the above image data, and embedded in somewhere of the image to be printed for printing out. When trying to copy the printed image in which the specific image information is embedded, the copy machine which has detected the specific image information will not output the copied image or output a copy sheet having thereon characters such as "Copy Prohibited".

The above-mentioned specific image information may be embedded in printed image in the way that it cannot be recognized by the user, or may be embedded, for discouraging the copying, in the way that it can be recognized by the user that it is the specific image information. In either case, the copy machine detects the presence of the specific image information in the image information when the image information in which the specific image information is embedded is copied and conducts predetermined processing, for example, prohibition of the copying per se or outputting of a copied image having characters such as "Copy Prohibited" in response to a detection result.

In connection with the technique for prohibiting unauthorized copying, a copy machine which is capable of easily making an original document bearing specific pattern thereon is disclosed in, for example, Japanese Laid-Open Patent Publication No. H7-38737. The copy machine comprises a generating means for generating (a) specific mark(s) for reproducing the image with adding the specific mark(s) to an original document image; a mark detecting means for detecting the presence of the specific mark(s) in read original document image; and a control means which conducts the copying operation which is different from usual copying operation if the specific mark in the original document image is detected by said mark detecting means.

A copy machine which reproduces an image which makes it possible to detect the specific mark(s) in an easy and precise manner is disclosed in Japanese Laid-Open Patent Publication No. H7-36325. This copy machine has a capability of reproducing an image to which (a) specific mark(s) is/are added by a mark adding means. The mark adding means adds specific marks, each comprising a plurality of concentric circles having different diameters, to the original document image.

Besides the technologies of Japanese Laid-Open Patent Publication Nos. H7-38737 and H7-36325, the methods of adding the specific image information include a method of mixing information in a frequency area as is the case of a digital watermark, a method of adding a bar-code, etc., to a non-image area, a method of adding information such as a watermark to an image area, etc.

With regard to a system that embeds specific image information in an image to be printed for printing out in accordance with a conventional art, in the case of a digital watermark, when additional information is embedded in a region that is difficult to be decoded, it is problematic that the embedded information cannot be utilized for some types of original image information. In the case of a method of adding a bar-code, etc., to a non-image area, it is problematic that an image area is narrowed, and in the case of a watermark, it is problematic that the printed document becomes less recognizable and an amount of toner consumption is increased.

In a system of such conventional art, when a printed image is read to detect whether specific image information is included, misrecognition is increased depending on characteristics of the printed image. For example, even though the specific image information is not printed on an original document, when the original document is copied, a characteristic of the original document may coincide with a characteristic of the specific image information and stop the print operation. Even if a characteristic of the original document does not coincide with the specific image information, when the original document is repeatedly copied many times, scratches may be formed and so-called trash or foreign particles may be printed, which may coincide with a characteristic of the specific image information and stop the print operation, although the specific image information is not printed on the original document. The detection accuracy of the specific image information is varied depending on usage patterns of a user and the information may not be detected in some cases.

SUMMARY OF THE INVENTION

An object of the present invention is to provide an image processing apparatus that can output an image from which only specific image information can be positively detected when the specific image information used to prohibit copying of image information is added to image data, a program incorporated into the image processing apparatus, and a computer-readable recording medium that records the program.

More specifically, an object of the present invention is to provide an image processing apparatus that performs image processing for input image data to output an image, the apparatus comprising: a specific image information adding portion that adds specific image information representing a specific image to the image data when the image processing is performed for the image data; and a specific image information setting portion that sets a color and/or number of the specific image information.

Another object of the present invention is to provide the image processing apparatus comprising a plurality of image data input portion that inputs the image data subjected to the image processing, wherein the specific image information setting portion sets the color and/or number of the specific image information in advance for each of the plurality of the image data input portion.

Another object of the present invention is to provide the image processing apparatus, wherein the specific image information setting portion includes an additional property selecting portion that allows a user to select a color and/or number of the specific image information.

Another object of the present invention is to provide the image processing apparatus, wherein the specific image information setting portion varies and sets a size of the specific image information depending on the setting of the color and/or number of the specific image information.

Another object of the present invention is to provide the image processing apparatus, wherein the specific image information setting portion includes a position selecting portion that allows a user to select a position to which the specific image information is added.

Another object of the present invention is to provide the image processing apparatus, wherein the specific image information adding portion adds a plurality of sets of the specific image information and wherein the plurality of sets of the specific image information is information including each set of the specific image information located at predetermined intervals.

Another object of the present invention is to provide a program that is incorporated into the image processing apparatus to allow a processing unit in the image processing apparatus to function as each portion.

Another object of the present invention is to provide a computer-readable recording medium that records the program.

PREFERRED EMBODIMENTS OF THE INVENTION

Figure 1:
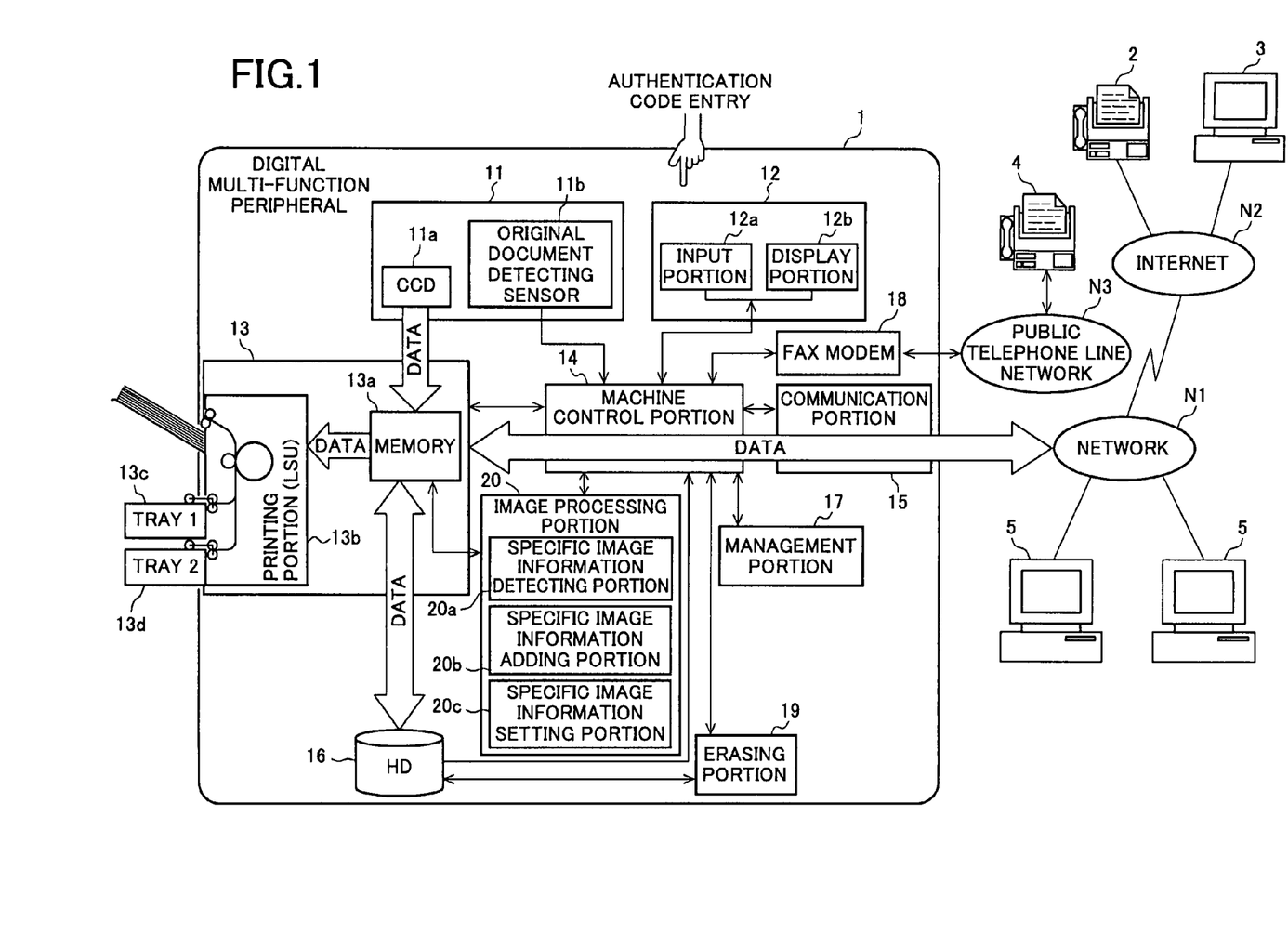
FIG. 1 is a block diagram for describing a configuration example of a digital multi-function peripheral to which an image processing apparatus of the present invention is applied.
Figure 2:
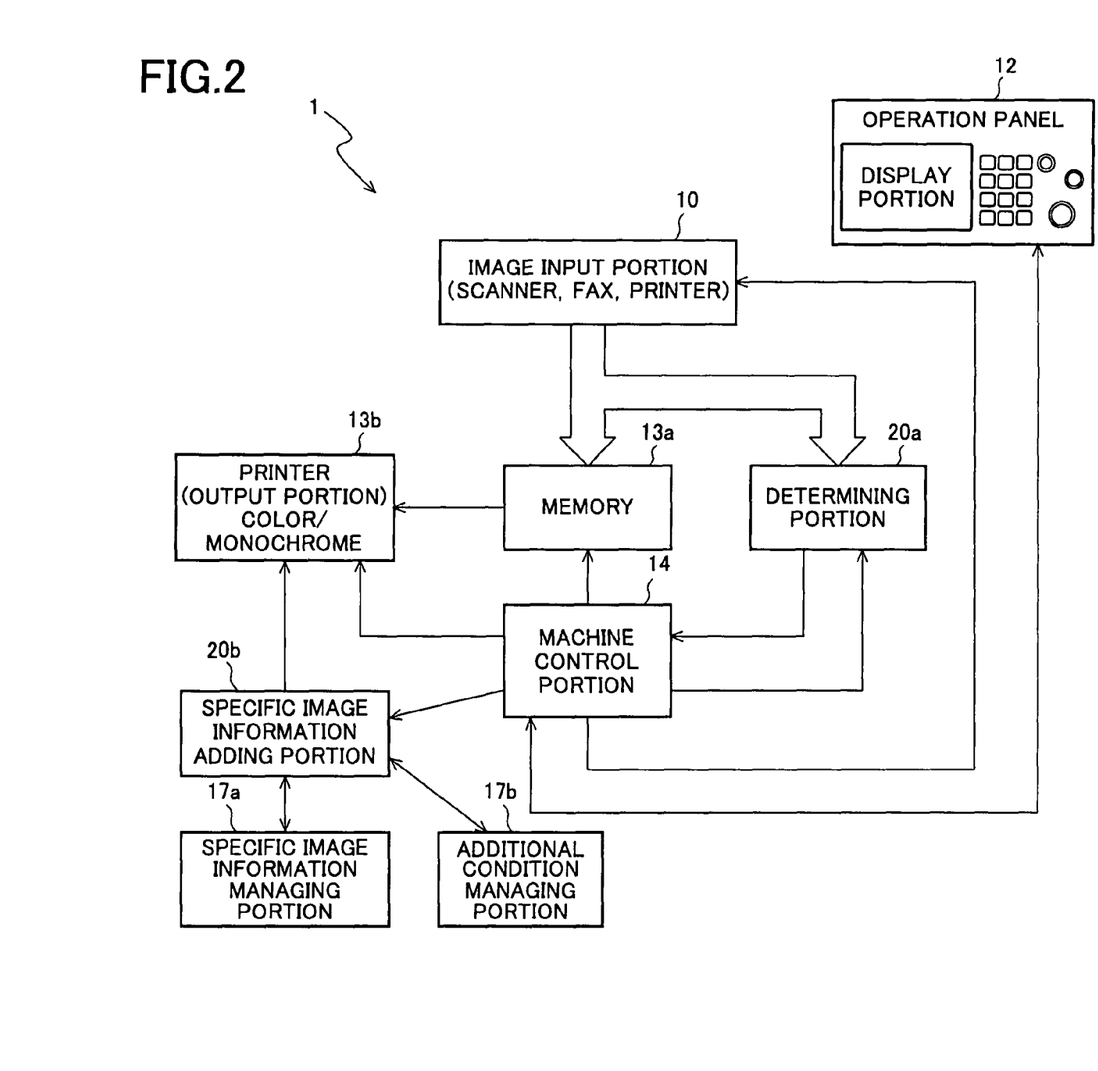
FIG. 2 is a block diagram of components mainly related to the present invention in the image processing apparatus of FIG. 1.
Figure 3:
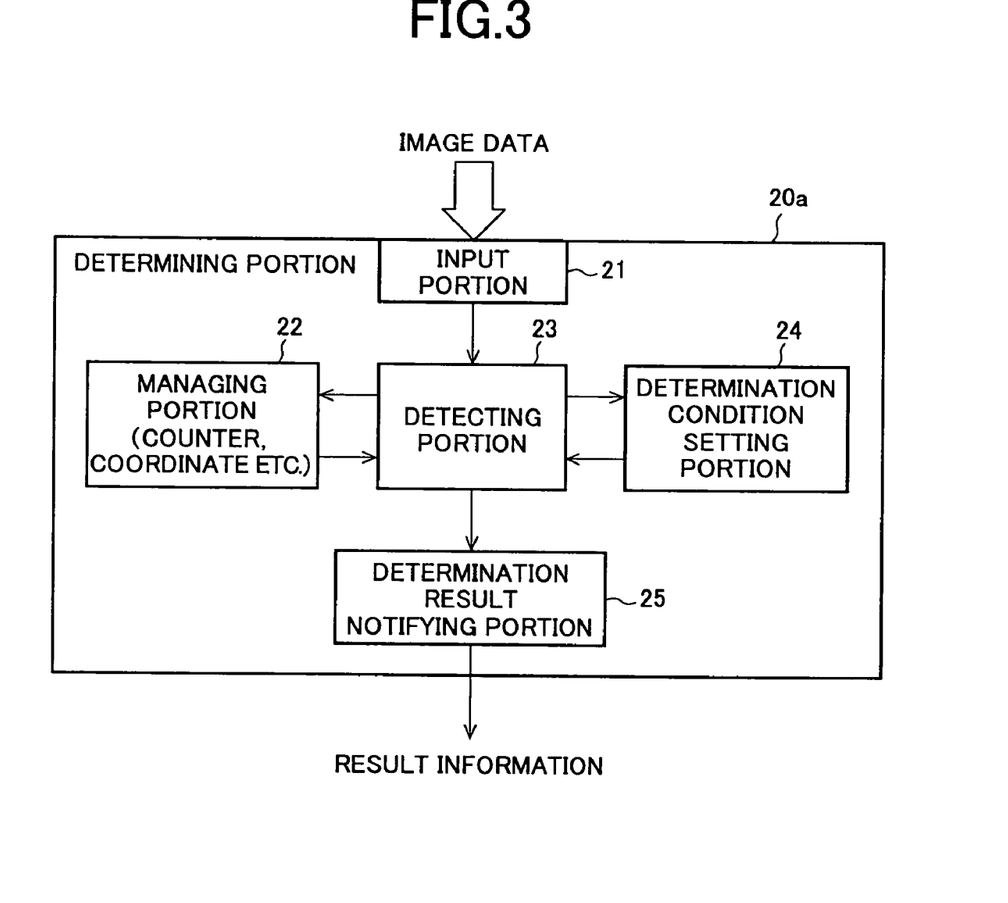
FIG. 3 is a block diagram of a configuration example of a determining portion in the image processing apparatus of FIG. 2.

FIG. 1 is a block diagram for describing a configuration example of a digital multi-function peripheral (compound machine) to which an image processing apparatus of the present invention is applied; FIG. 2 is a block diagram of components mainly related to the present invention in the image processing apparatus of FIG. 1; and FIG. 3 is a block diagram of a configuration example of a determining portion in the image processing apparatus of FIG. 2. A digital MFP (multi-function peripheral) 1 exemplified in FIG. 1 is an MFP including functions of a copy machine, printer apparatus, facsimile apparatus, and scanner apparatus.

The digital MFP 1 comprises a machine control portion 14 including a CPU which performs arithmetic operations and a RAM and the like which store temporal information in association with the operations. A ROM which stores a control program for controlling the digital MFP 1 is included in the machine control portion 14. A management portion 17 which is a memory storing management information (various items of control information) for managing the processing conducted by the digital MFP 1 is connected to the machine control portion 14. An image reading portion 11 which reads images recorded on the recording paper to generate image data is connected to the machine control portion 14. The image reading portion 11 is provided with a CCD 11a for reading original document images as image data and an original document detecting sensor 11b which detects the presence or absence of the original document.

An image forming portion 13 which functions as an image forming portion to form image data on recording paper is connected to the machine control portion 14. The image forming portion 13 is provided with a memory 13a for temporarily storing the image data, a printing portion (LSU) 13b which forms images from the image data stored by the memory 13a for recording them on recording paper, and sheet trays 13c, 13d from which recording paper is fed for the image formation at the printing portion 13b. The digital MFP 1 can form images at the printing portion 13b after the image data generated by the image reading portion 11 are stored on the memory 13a once. In such a manner, the digital MFP 1 functions as a copy machine.

A FAX modem 18 for conducting facsimile communication is connected to the machine control portion 14 exemplified in FIG. 1. The FAX modem 18 is also connected to a public telephone line network N3. The digital MFP 1 is capable of transmitting the image data which is generated by the image reading portion 11 to another facsimile apparatus 4 via the public telephone line network N3 which is connected to the FAX modem 18 by the facsimile communication. The digital MFP 1 is also capable of receiving the image data transmitted from the other facsimile apparatus 4 via the public telephone line network N3 at the FAX modem 18 to form images from the received image data at the image forming portion 13. In such a manner, the digital MFP 1 also functions as a facsimile apparatus.

A communication portion (transceiver portion) 15 which enables the digital MFP 1 to transmit/receive information to/from an external source is connected to the machine control portion 14. The communication portion 15 can be connected to a communication network N1 such as intra-LAN and the like. One or more personal computer(s) (PC(s)) 5 can be connected to the communication network N1. In a usual situation at which the digital MFP 1 is operated alone, the communication portion 15 is connected to the communication network N1 for exchanging information with PC(s) 5 via the communication network N1.

The digital MFP 1 is capable of transmitting image data which is generated by the image reading portion 11 to PC 5 from the communication portion 15. Thus, the digital MFP 1 functions as a scanner apparatus. Further, the digital MFP 1 is capable of receiving the image data transmitted from PC 5 at the communication portion 15 for forming images from the received image data at the image forming portion 13. Thus, the digital MFP 1 serves as a printer apparatus.

The communication network N1 is connected to a wide area communication network N2 such as the Internet. The communication portion 15 is capable of receiving image data from the Internet facsimile apparatus 2 or an external PC 3 which is connected to the wide area communication network N2 via the communication network N1 and wide area communication network N2 through techniques such as transmitting image data with attaching them to an electronic mail. Thus, the digital MFP 1 also serves as an Internet facsimile apparatus.

An operation portion 12 which accepts operations by the user is connected to the machine control portion 14. The operation portion 12 comprises an input portion 12a such as a touch panel or ten-key pad from which information such as a control instruction is entered by the operation of the user, and a display portion 12b such as a liquid crystal panel which displays information necessary for the operation. Authentication codes which authenticate the administrator or user (i.e., operator) of the present digital MFP are entered into the operation portion 12. In some cases, the authentication codes may be entered from an external device via the FAX modem 18 or communication portion 15.

A hard drive (HD) 16 is connected to the machine control portion 14. The hard drive 16 stores image data which is related with image processing of the image data which is generated by the image reading portion 11, and the like. An erasing portion 19 is also connected to the machine control portion 14. The erasing portion 19 erases data recorded and retained on the hard drive 16 under control of the machine control portion 14.

The machine control portion 14 is connected with an image processing portion 20 that realizes a process of adding specific image information relating to the present invention. The image processing portion 20 includes a specific image information adding portion 20b for adding specific image information representing a specific image to image data. In the case of an image recording process, the specific image information is information representing a recorded matter recording a specific image.

The specific image information adding portion 20b preliminarily retains the specific image information to be added to image data (or allows another accessible memory to retain the information), adds the specific information to the image data under the control of the machine control portion 14 for adding the specific image information, and allows the memory 13a to retain the image data. The image data processed by the image processing portion 20 are print data in the form of final output from the printing portion 13b. As described above, the specific image information is used to prohibit copying (or to discourage a user by allowing the user to recognize that copying is prohibited) and, for example, in the case of a color MFP, yellow specific image information is added in an invisible manner. In the case of a black-and-white MFP (or black-and-white output of a color MFP), black (gray) with controlled density is added in an invisible manner.

The present invention includes a specific image information setting portion 20c that sets a color and/or number of the specific image information, along with the specific image information adding portion 20b. The specific image information setting portion 20c is included in the image processing portion 20 as shown, for example. The specific image information setting portion 20c sets a color and number of the specific image information in accordance with the setting control of the machine control portion 14 in advance, and the specific image information adding portion 20b adds the specific image information to the image data based on the color and number set by the specific image information setting portion 20c for the preliminarily retained specific image information to be added to the image data. The present invention includes a portion that performs an image process (such as image reproduction) for the specific image information to form an image with the set color or number.

Preferably, the specific image information setting portion 20c includes an additional property selecting portion that allows a user to select a color and/or number of the specific image information from the operation portion 12, etc. Preferably, the specific image information setting portion 20c includes a position selecting portion that allows a user to select a position to which the specific image information is added. With the position selecting portion, a user can select from the operation portion 12, etc., whether the specific image information is located all over paper or located at a corner only, for example. Preferably, a user capable of performing the user setting is an administrating user. The specific image information setting portion 20c may automatically vary and set the size of the specific image information depending on the setting of the color and/or number of the specific image information.

When the printing portion 13b forms an image from image data read by the image reading portion 11 or image data input externally via the FAX modem 18 or the communication portion 15, the image processing apparatus of the embodiment with the above configuration adds specific image information as exemplified later, for example.

A plurality of image data input portion may be included to input image data subjected to the image processing in this way, and the specific image information setting portion 20c may set a color and/or number of the specific image information in advance for each of the plurality of the image data input portion (corresponding to image input modes). The plurality of the image data input portion indicates not only differences in the input path of the image data, but also each of the image input modes such as printing in a photograph mode, printing in a black-and-white mode, printing in a mode for printing darker, or printing in a mode for printing lighter, even when the image data are read from the same original document, for example.

In the setting and adding processes of the specific image information, the preferred implementations described above may be employed appropriately to perform the processes. For example, a predetermined pattern (copying prohibition) image of the specific image information can be selected from single toner colors of YMCK, and a plurality of patterns with the same color or different colors may be added to one piece of output paper. When printing in a black-and-white copying (FAX, printer) mode, a color of the added pattern may be black, and when printing in a color mode, the color may be selected from four colors of YMCK. When a yellow pattern is selected, the pattern may be colored deeper or include larger dots as compared to the case of selecting a black pattern such that the pattern is detected even when recycled paper is used. When the image data are printed as a monochromatic binary format image, a density value of the additional pattern may be lower than a density value for printing the image data.

The predetermined pattern images may be added as at least M+N same images. When the patterns are actually detected, since an original document is recognized as an original document with additional information by detecting N patterns, only a part of the added patterns is needed to be detected and, therefore, the additional pattern can be an inconspicuous pattern. By reducing a primitive size of the additional printing pattern printed in black as compared to that of the pattern printed in yellow, the pattern can be detected when the pattern is printed on recycled paper and the pattern can be an inconspicuous, light and small pattern.

The additional pattern images may be added to at least four corners of fed paper, which is useful at the time of one-set-two-copy, or may be added to at least four corners of an original document paper, which is useful at the time of two-in-one. However, by adding the additional pattern images all over the fed paper, the images can be detected even when the paper is cut and pasted. The number of the additional pattern images may be varied depending on security strength.

On the other hand, the image processing portion 20 includes a specific image information detecting portion 20a that detects whether the specific image information is included in the image data read by the image reading portion 11 and stored in the memory 13a. If the image data include the specific image information as a result of the detection by the specific image information detecting portion 20a, the machine control portion 14 performs control to prohibit copying of the image data (to disable the image formation in the image forming portion 13).

Preferably, the present invention includes an image disabling portion in the image processing portion 20, etc. In other words, the image disabling portion disables the image in formation read by the image reading portion 11 if the specific image information detecting portion 20a determines that the specific image information exists. Since some original documents have congested characters or an output (print and FAX output) part called trash, the specific image information setting portion 20c preferably sets and forms the predetermined image to be added such that at least M+N same patterns are added as described above and, at the time of recognition, the specific image information detecting portion 20a detects the image when M additional patterns are recognized. Information of M may be determined by percentage of the number of the additional patterns of course.

In the present invention, since the specific image information setting portion 20c sets the color and number (and position) of the specific image information, the detection accuracy of the specific image information can be increased regardless of a usage pattern of a user when the specific image information is detected.

The addition and detection of the specific image information according to the present invention will be described more specifically with reference to FIGS. 2 and 3. The digital MFP 1 mainly includes: an operation panel 12 for printing, etc., of an original document set by a user, for example; an image input portion 10 such as a scanner, FAX, and printer for inputting data of an original document; the memory 13a that temporarily stores the image data input through the image input portion 10; the specific image information detecting portion (determining portion) 20a that determines whether a specific image is output to (the specific image information is included in) the original document image data input through the image input portion 10 as well; a specific image information adding portion 20b that adds the specific image information to the image data stored in the memory 13a based on a predetermined condition (e.g., conditions of access right or process path); a specific image information managing portion 17a that stores one or a plurality of types of the specific image information to supply the specific image information adding portion 20b with a relevant type of the specific image information when the specific image information adding portion 20b adds the information; an additional condition managing portion 17b (including the specific image information setting portion 20c) that sets and stores the color, number, position, etc., (additional condition) of the specific image information supplied by the specific image information managing portion 17a; an output portion (printer 13b, etc.) that outputs the image data with the specific image information added by the specific image information adding portion 20b based on the color, number, and position managed at and selected from the additional condition managing portion 17b when the image data stored in the memory 13a satisfy the aforementioned predetermined condition(s); and the machine control portion 14 that controls these components.

With such a configuration, the image processing portion 20 performs a deployment process of the input image data and allows the image memory 13a to store and retain the image data as print execution data. The image processing portion 20 sets the color and number with the specific image information setting portion 20c and adds the specific image information with the set color and number to the image data with the specific image information adding portion 20b to generate the print execution data. The printer 13b uses the print execution data recorded and retained in the image memory 13a to form an image on a recording sheet, etc.

The determining portion 20a mainly includes: an input portion 21 that inputs image data; a detecting portion 23 that detects the specific image information from the input image data; a managing portion 22 that includes a counter counting the number of pieces of the specific image information detected by the detecting portion 23 to manage a count value, coordinates, etc.; a determination condition setting portion 24 that sets a determination condition (such as the number of pieces of the specific image information) in the detecting portion 23; and a determination result notifying portion 25 that determines whether the determination condition is satisfied by the number detected by the detecting portion 23 to notify the machine control portion 14 of the result information.

Figure 4:
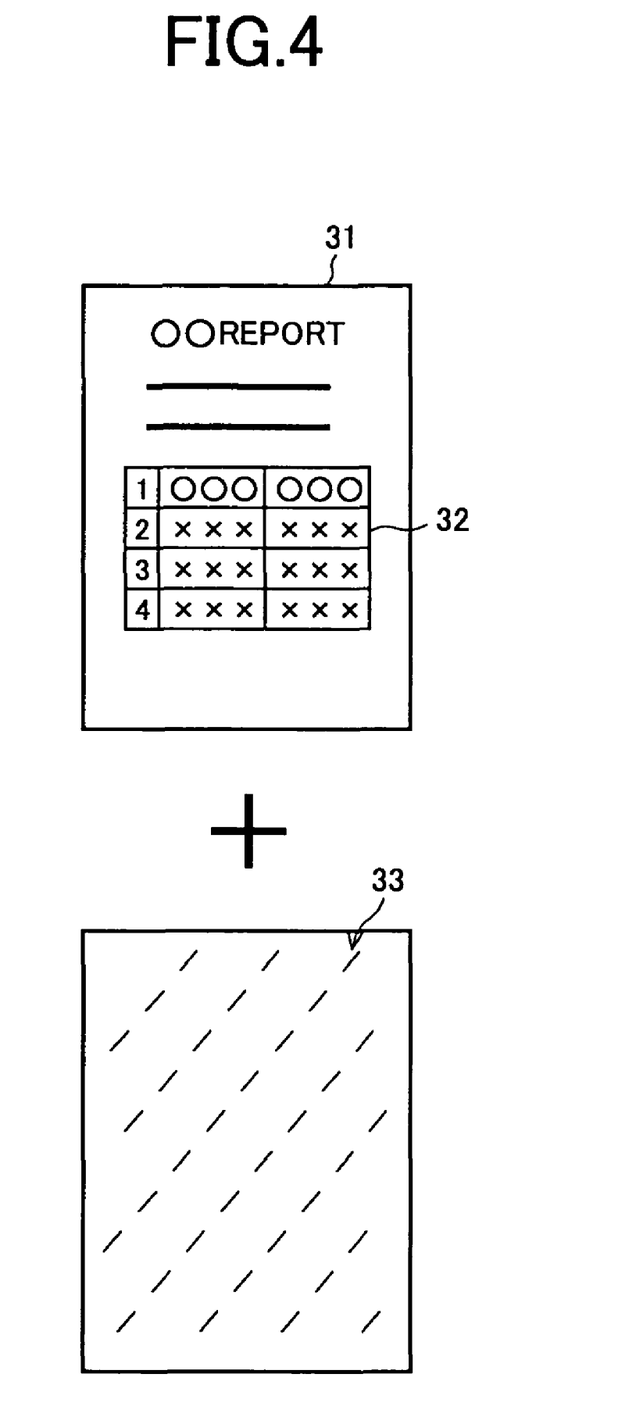
FIG. 4 is a diagram for schematically describing a specific image information adding process according to the present invention.
Figure 5:
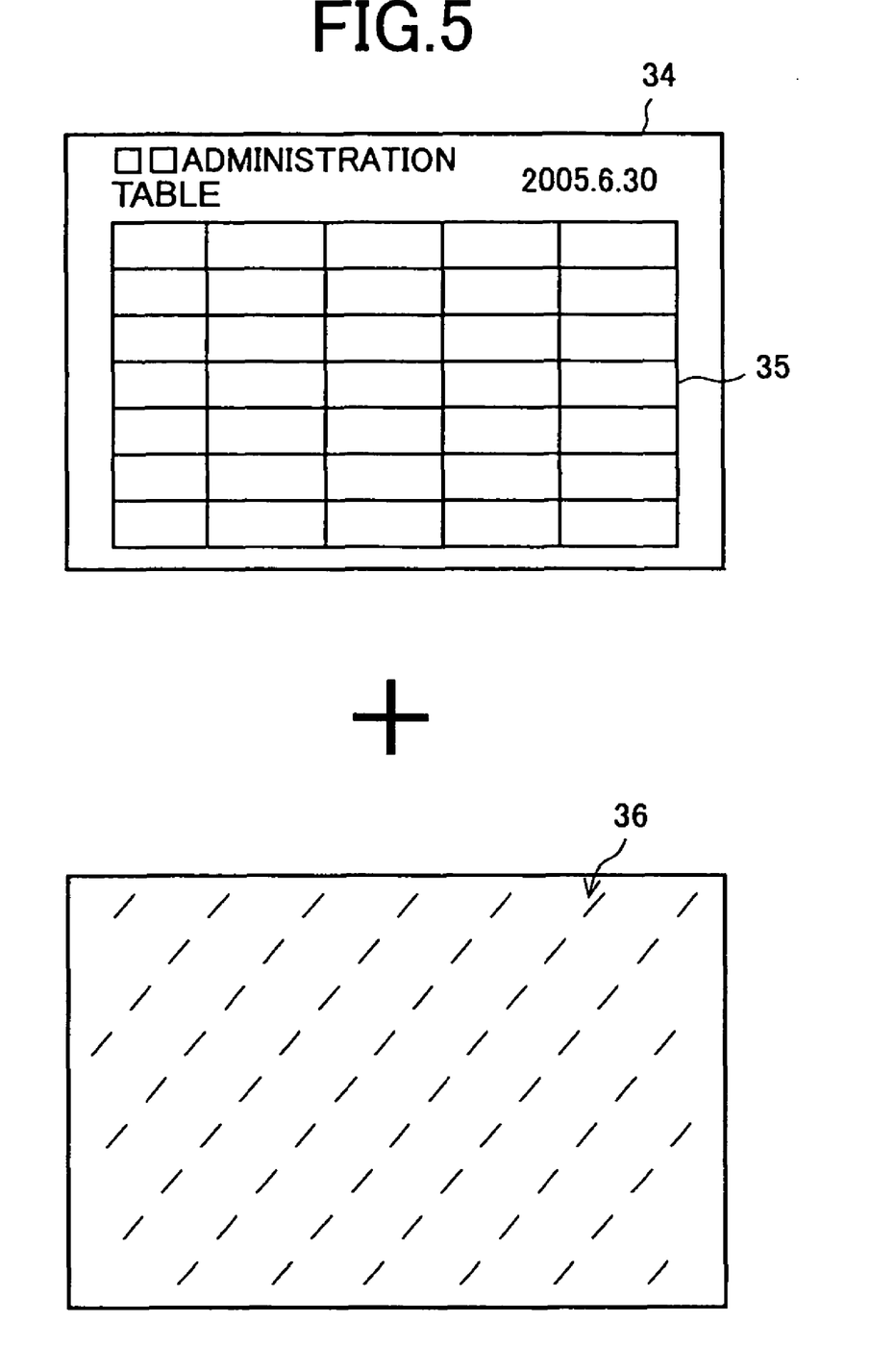
FIG. 5 is a diagram for schematically describing a specific image information adding process according to the present invention.

The specific image information according to the present invention will be described with specific examples. FIGS. 4 and 5 are diagrams for schematically describing an example of a specific image information adding process according to the present invention.

In the described example, specific image information 33 is information with a characteristic that does not overlap a characteristic defined preliminarily as a characteristic (e.g., ruled lines 32) of image data 31 assumed to be input by an administrator or vendor. That is, in the exemplified specific image information adding portion 20b, when the predetermined image (anti-copy) 33 is added to the output image 31, the image is added so as not to overlap the characteristic of the predetermined image 33 with the characteristic 32 of the output image 31 such that the specific image information detecting portion 20a (or a similar specific image information detecting portion included in another device) can recognize the specific image.

As shown in FIG. 4, the preliminarily defined characteristic is preferably a characteristic relating to a predetermined angle (line angle) defined as an angle associated with many lines among lines included in the image data. The specific image information 33 is defined as information for outputting lines with a predetermined length and an angle different from the predetermined angle (output results are also shown by a reference numeral 33). That is, the specific image information is added with an angle (45 degrees in this example) such that the characteristics do not overlap between the characteristic of the image data 31 assumed to be input and the characteristic of the added specific image information 33. By adding the anti-copy image such that the characteristic of the original document image is differentiated from the characteristic of the anti-copy, for example, such that the anti-copy image is tilted relative to the original document image, the detection accuracy can be improved in the specific image information detecting portion 20a (or a similar specific image information detecting portion included in another device) described later.

The specific image information adding portion 20b is a portion that adds a plurality of sets of the specific image information as shown by the specific image information 33, and the plurality of sets of the specific image information is preferably a plurality of lines with a predetermined length located periodically along a straight line and a plurality of rows of the lines is located in the direction vertical to the straight line at regular intervals.

The line may be a solid line as shown by the specific image information 33 or may be a dotted line or dashed line. When the line is a dotted line or dashed line, one constituent element of the specific image information is a plurality of dots or short lines. FIG. 5 illustrates the case that image data 34 are positioned in the horizontal direction, and ruled lines 35 included in the image data 34 and specific image information 36 are the same as those of FIG. 4.

The specific image information adding portion 20b is a portion that adds a plurality of sets of the specific image information as shown by the specific image information 33, and the plurality of sets of the specific image information is preferably information including each piece of the specific image information located at predetermined intervals. By adding the plurality of sets of the specific image information 33, a dashed line is formed which includes the aforementioned lines as constituent elements, and a plurality of the dashed lines is added and arranged at an angle.

Figure 6:
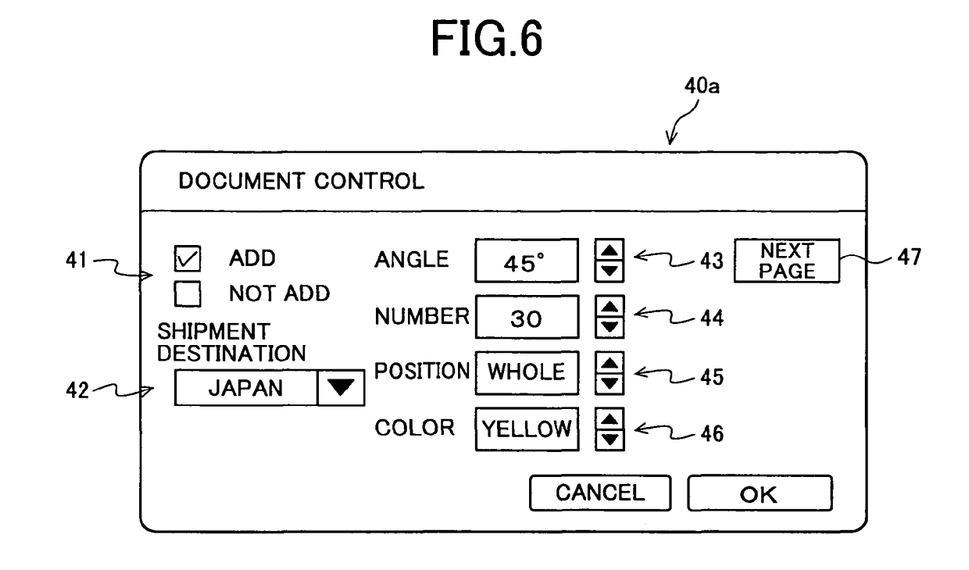
FIG. 6 is a diagram for describing a setting example for setting characteristics of the specific image information.
Figure 7:
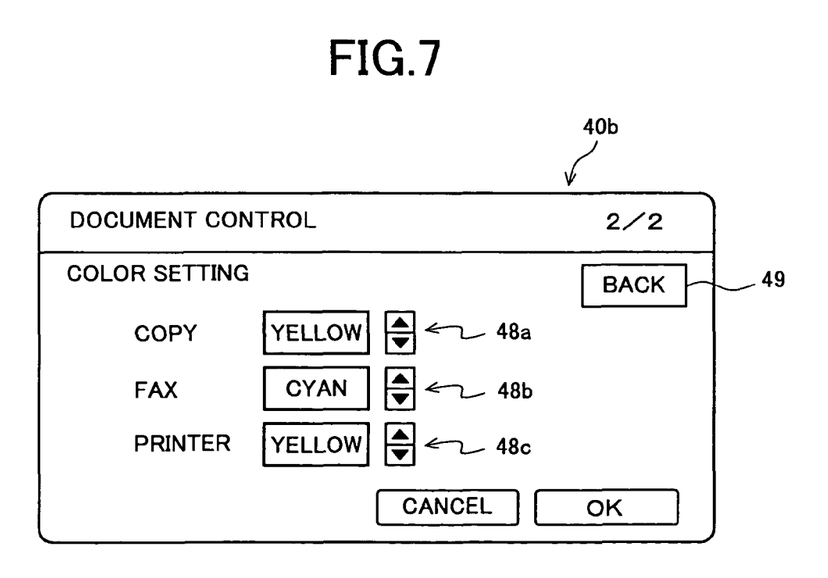
FIG. 7 is a diagram for describing a setting example for setting characteristics of the specific image information.

FIGS. 6 and 7 are diagrams for describing a setting example of setting characteristics of the specific image information and show an example of a display screen displayed by the display portion 12b of the digital MFP 1. The present invention preferably includes a characteristic setting portion as a portion of the specific image information setting portion 20c to set a characteristic not overlapping a predefined characteristic and, for example, only a vendor and administrator must be allowed by default to execute the setting such that at least general users cannot execute the setting.

A GUI screen example 40a shown in FIG. 6 includes items for setting setup conditions of characteristics of the specific image information, which are an angle input field 43, a number (number indicating how many sets of the specific image information are added) input field 44, a position (position indicating what position on an original document the specific image information is added) input field 45, a color (color indicating what color the specific image information is added in) input field 46, a shipment destination (shipment destination indicating what country or region the digital MFP 1 is shipped to) input field 42, and a next item button 47 for proceeding to the next item. The example of FIG. 6 also includes check boxes 41 for setting whether the specific image information is added.

The angle input field 43 is a setting field for inputting, or selecting and inputting, an angle different from an angle of lines assumed to be included mainly in the image data to add a line or lines with the input angle for the specific image information. Since the present invention can add angled lines and many documents include ruled lines and pictures in Japan although few documents include ruled lines overseas, the specific image information is added as lines with an angle of 45 degrees to prevent ruled lines or the like from being misrecognized as a mark and prevent a copy machine from being stopped when the ruled lines or the like are repeatedly copied and scratched. Actually, although ruled lines and underlines or deletion lines of characters appear frequently in an original document, few lines have an angle. In that respect, angled lines may be used as a mark to prevent the misrecognition from occurring when texts are scratched. Since line images such as vertical lines and horizontal lines are frequently included as characteristics of an original document, the angled lines are correspondingly added as the additional images such that the angled lines do not overlap the line images. The present invention preferably includes a portion that sets the condition (angle) for adding the image such that the characteristics do not overlap each other.

The shipment destination input field 42 is a setting field for inputting (selecting and inputting) a destination (area where the digital MFP 1 is used), and the input destination is linked to an angle of the specific image information specified by a vendor in advance and enables the angle to be set indirectly when the destination is set without setting the angle. For example, since few ruled lines are used in United States, this destination may be linked to an angle slightly smaller than 45 degrees. The aforementioned characteristic setting portion preferably includes a portion that sets a characteristic not overlapping the predefined characteristic correspondingly to the setting of the usage area of the image processing apparatus to add the specific image at an angle depending on destinations such that the characteristics do not overlap each other.

The number input field 44 is a field for inputting, or selecting and inputting, the number of sets (M+N described above) of the specific image information and may also be used to set the number of M described above, which corresponds to a detection level for disabling an image. The detection may be performed based on a distance or positional relationship between one type of the specific image information (mark) as well as the number. For example, if a user selects a photograph mode for copying, an administrator may be able to perform initial setup for reducing a percentage, detecting whether a predetermined number of patterns exist, or detecting whether a predetermined number (such as three) of patterns exist at constant intervals.

The position input field 45 is a field for selecting and setting a position where the specific image information is added. The position may be selected and set from a whole area, four corners, both ends, outer frame, etc. The specific image information is added to a whole area (whole surface) so as to support the detection of the mark and the copy protection based on the detection even when a part of a printed paper sheet is clipped and copied.

In the color input field 46, a user can select a color of the specific image information from a plurality of colors. A GUI screen example 40b shown in FIG. 7 includes items for setting the color, which are a copy color input field 48a, a FAX color input field 48b, a printer color input field 48c, and a button 49 for returning to the previous items (the GUI screen 40a). The colors can be set depending on input modes such as copy mode, fax mode, and printer mode.

Although not shown, a job setting field maybe included to change an added angle depending on a job. For example, since it is assumed that many angled lines are used in a copying machine utilized by a designer, a straight line may be used in some cases or a set of marks may be formed by combining lines with a plurality of angles.

The check boxes 41 are setting fields for setting whether the specific image information is added, and thus, an additional condition setting portion is preferably included to set an additional condition for determining whether the specific image in formation adding portion 20b adds the specific image information. The additional condition setting portion may also be realized by the additional condition managing portion 17b of FIG. 2, etc. With regard to the setting field like the check boxes 41, a corresponding field may be checked with a printer driver of a PC, may be operated with the operation portion 12 of the device, or may be operated manually.

Such an additional condition may be set automatically and, for example, whether the addition is performed may be decided based on determining whether a confidential process is performed or determining whether an output material (printed material, etc.) is output by a user at a certain access right level when the access right is checked through the user authentication. For example, when a manager prints an original document, it is automatically determined that the original document is important and an additional image is automatically added, or when output is suspended once and then performed after waiting for input of a password, etc., i.e., when a hold-print function (confidential print function) is used, it is determined that the original document should not be read by others and an additional image is automatically added.

When the printing portion 13b forms an image from image data read by the image reading portion 11 or image data input externally via the FAX modem 18 or the communication portion 15, the digital MFP 1 adds the specific image information in accordance with the predefined additional condition to the image data corresponding to the additional condition, depending on the additional condition, in the form defined by the set color, number, and position. The additional condition of the specific image information is set and retained by the additional condition managing portion 17b. For example, the additional condition may be set and retained in a memory of the image processing portion 20 or a memory that the image processing portion 20 can access.

Figure 8:
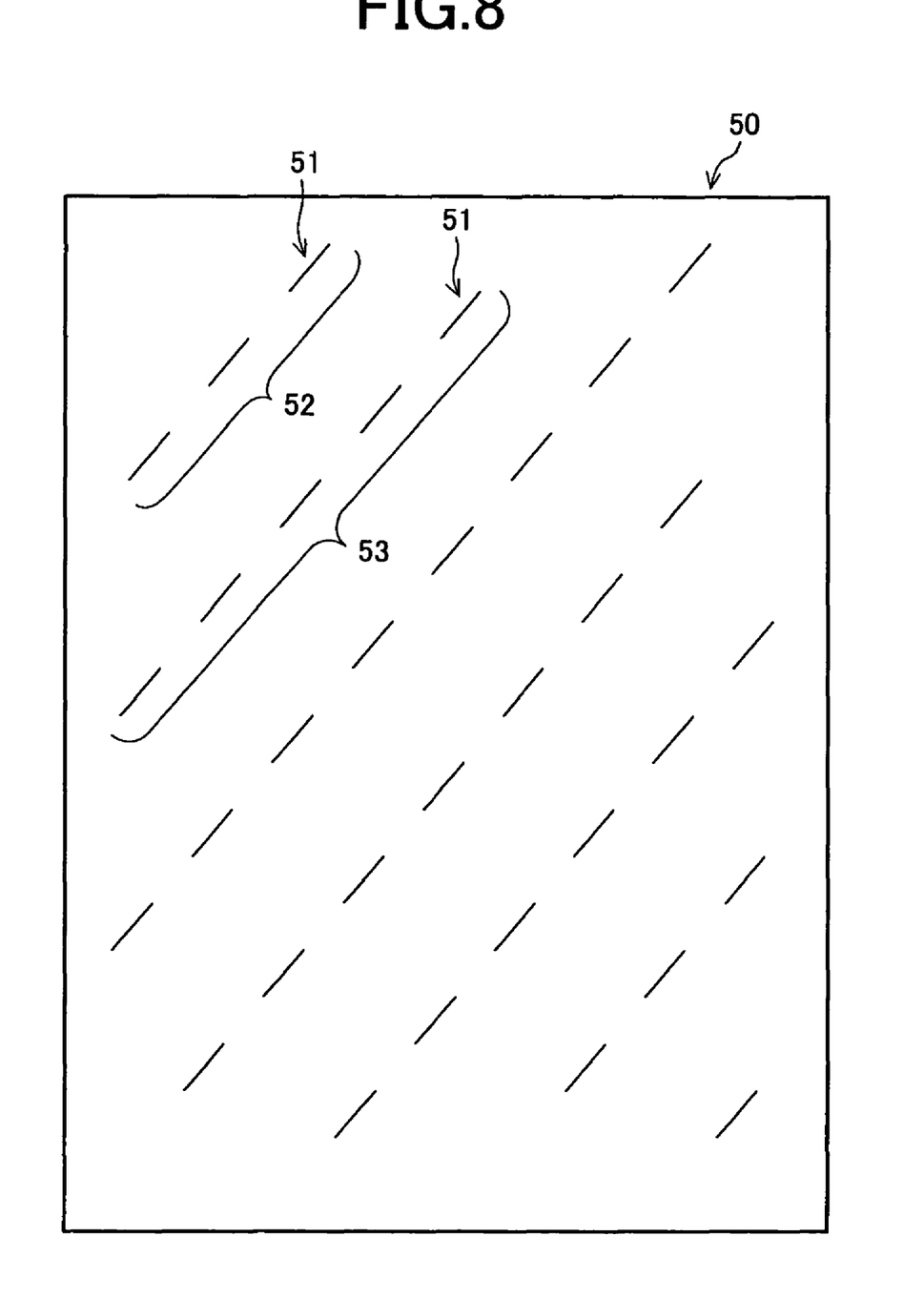
FIG. 8 is a diagram for describing another example of the specific image information according to the present invention.

FIG. 8 is a diagram for describing another example of the specific image information according to the present invention. In the present invention, as shown by specific image information 50 of FIG. 8, a line 51 with a predetermined length described above in a row 52 is preferably located so as not to overlap a line 51 of a row 53 adjacent in the vertical direction. That is, in the present invention, predetermined images generated at predetermined cycles are preferably added such that adjacently arranged pieces of the predetermined information do not overlap (form a zigzag shape). When images are added in such a shape, it is difficult for a person who watches this output material to visually recognize that the specific image information is added.

Figure 9:
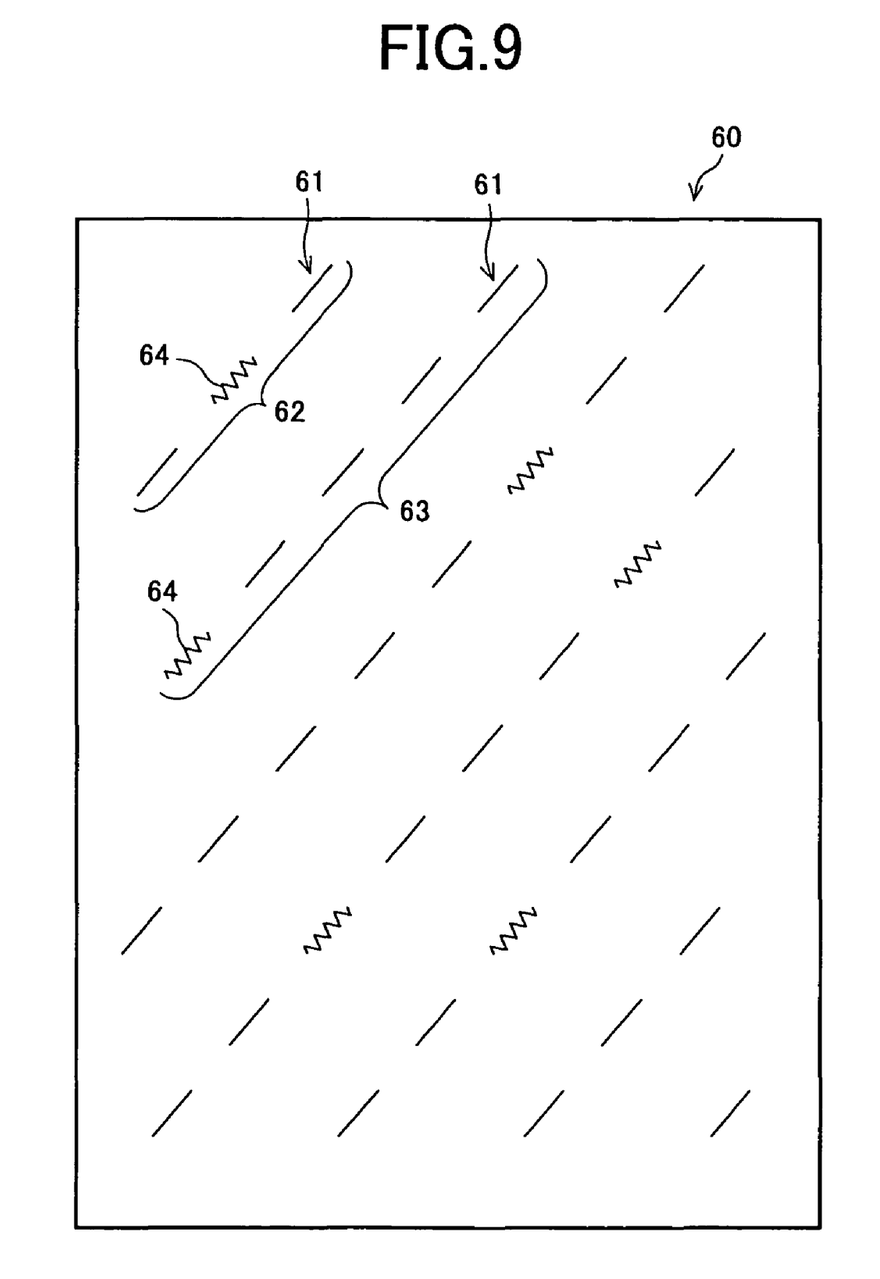
FIG. 9 is a diagram for describing another example of the specific image information according to the present invention.

FIG. 9 is a diagram for describing another example of the specific image information according to the present invention. The present invention preferably includes a similar image adding portion that adds images 64 similar to the specific image information instead of a part of sets of the specific image information. As shown by specific image information 60 of FIG. 9, two pieces of specific image information 61 are added to a row 62 along with the similar image 64 (a jagged line in this example), and four pieces of the specific image information 61 are also added to another row 63 along with the similar image 64. In the present invention, the images similar to the predetermined images are preferably added together with the predetermined images added. By adding the images in such a form, the added specific information is camouflaged and can be made difficult for a person who watches this output material to visually recognize.

The present invention may detect characteristics of an original document and change the color, number, and angle of the added patterns depending on the characteristics. In this implementation, the digital MFP 1 includes an image characteristic extracting portion that extracts characteristics of the input image data, and the specific image information setting portion 20c includes a deciding portion that selects and decides the color, number, and angle of the added specific image information from a plurality of types of the specific image information (corresponding to predefined characteristics) such that the characteristics of the specific image information do not overlap the characteristics of the image data extracted by the image characteristic extracting portion.

The machine control portion 14 described in FIG. 1 will be described complementarily. The control portion 14 of FIG. 1 actually includes a processing unit such as CPU and MPU, a ROM (preferably, a rewritable ROM) that stores firmware including a specific image information adding program, a RAM that is an execution area used when the processing unit reads and executes the firmware, etc. In this way, the present invention can employ a form of a specific image information adding and setting program. This program may be a program for allowing the processing unit to execute at least the specific image information adding and setting process according to the embodiment. That is, the program is incorporated into the image forming apparatus such as the digital MFP 1 or other image processing apparatuses to allow the processing unit in the apparatus to function as the specific image information adding portion 20b and the specific image information setting portion 20c described above (including the additional property selecting portion and the position selecting portion) as well as other aforementioned portion such as the specific image information detecting portion 20a, a part of the image reading portion, the image disabling portion, the characteristic setting portion, the similar image adding portion, the additional condition setting portion, and the image characteristic extracting portion.

Figure 10:
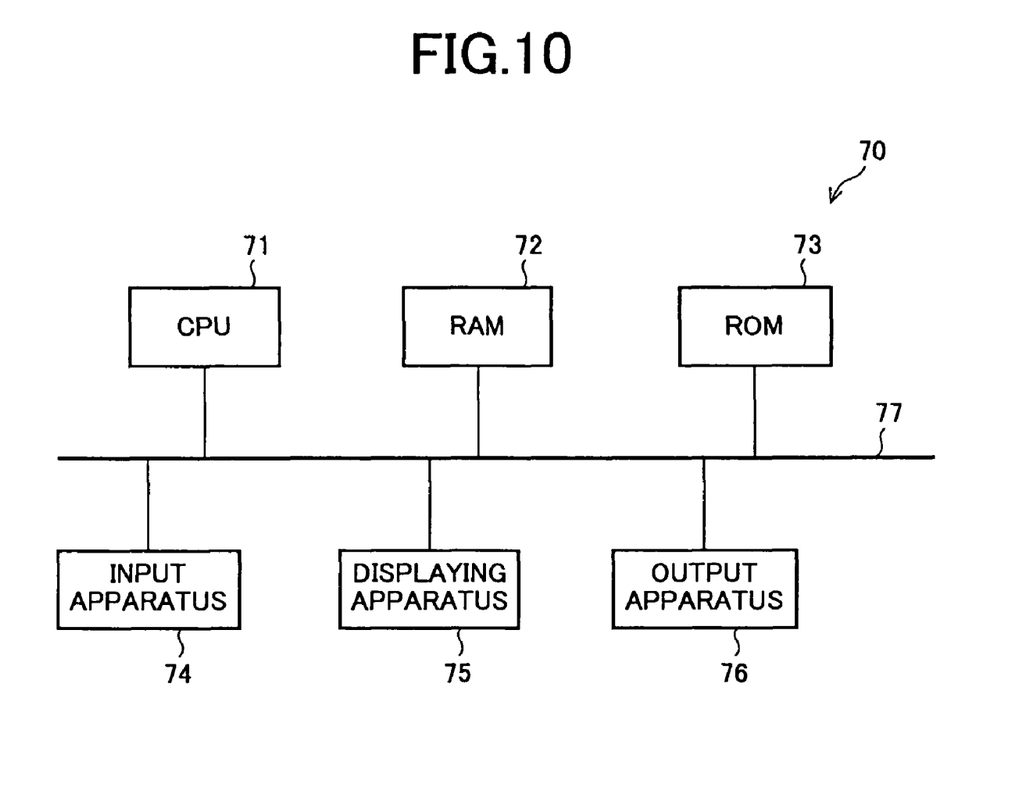
FIG. 10 is a diagram of one configuration example of a typical information processing apparatus.

Description will be made of an example of the machine control portion 14, which is a configuration example of a typical information processing apparatus including the machine control portion 14 as shown in FIG. 10. Main components of an information processing apparatus 70 include: an input apparatus 74 for inputting various pieces of information, such as a keyboard, a mouse, a recording medium reading apparatus, and a network device for input from other devices; a displaying apparatus 75 as a display for displaying various pieces of information (which may be combined with the input apparatus 74 to constitute a touch panel), such as a CRT (Cathode-Ray Tube), an LCD (Liquid Crystal Display), and a PDP (Plasma Display Panel); an output apparatus 76, such as a communicating apparatus, for example, a network connecting apparatus (a communication device such as a network board for connecting with and communicating through a network), a printing apparatus, and an external output apparatus, for example, a recording apparatus for a recording medium; a hard disk or ROM 73 that records a program; a CPU 71 for executing the stored program; and a RAM 72 used for the execution area, and these components are connected with a bus 77 in the illustration. The program may include a GUI (graphical user interface) for the display apparatus 75 such that a user can easily use the program at the time of various settings. The information handled in these apparatuses is accumulated temporarily in the RAM 72 when processed and is then stored in the ROM 73 or hard disk, and the CPU 71 read the information for modification and rewrite as needed.

The present invention can employ a form of a computer-readable recording medium that records a program or data incorporated into the image processing apparatus as described above. Specifically, such a recording medium can be assumed to be a CD-ROM, a magnetic optical disk, a DVD-ROM, an FD, a flash memory, and other various ROMs and RAMs. The functions according to the present invention can be easily realized by recording the aforementioned program with the recording medium and distributing the medium. The program can be stored in the image processing apparatus in an executable manner by loading the aforementioned recording medium into an information processing apparatus such as a computer, reading out the program with the information processing apparatus, and transferring the program to the control portion of the image processing apparatus, for example. The function according to the present invention can be executed by reading out the program as needed.

The present invention can output an image from which only specific image information can be positively detected when the specific image information used to prohibit copying of image information is added to image data.

The invention claimed is:

1. An image processing apparatus that performs image processing for input image data to output an image, the apparatus comprising: a specific image information adding portion that adds specific image information to control unauthorized copying of the image, said specific image information representing a specific image to the image data when the image processing is performed for the image data;

a specific image information setting portion that sets a color and number of the specific image information; and a plurality of image data input paths that input the image data subjected to the image processing, wherein the specific image information setting portion sets the color and number of the specific image information in advance for each of the plurality of image data input paths.

2. The image processing apparatus as defined in claim 1, wherein the specific image information setting portion includes an additional property selecting portion that allows a user to select a color and number of the specific image information.

3. The image processing apparatus as defined in claim 1, wherein the specific image information setting portion varies and sets a size of the specific image information depending on the setting of the color and number of the specific image information.

4. The image processing apparatus as defined in claim 1, wherein the specific image information setting portion includes a position selecting portion that allows a user to select a position to which the specific image information is added.

5. The image processing apparatus as defined in claim 1, wherein the specific image information adding portion adds a plurality of sets of the specific image information and wherein the plurality of sets of the specific image information is information including each set of the specific image information located at predetermined intervals.

* * * * *